United States Patent [19]
Balukin et al.

[11] Patent Number: 5,192,118
[45] Date of Patent: Mar. 9, 1993

[54] ELECTRO-PNEUMATIC LOCOMOTIVE BRAKE CONTROL SYSTEM

[75] Inventors: Richard F. Balukin; John B. Newingham, both of Pittsburgh; Frank J. Jerina, Irwin, all of Pa.

[73] Assignee: Westinghouse Air Brake Company, Wilmerding, Pa.

[21] Appl. No.: 710,849

[22] Filed: Jun. 6, 1991

[51] Int. Cl.[5] .................................... B60T 15/14
[52] U.S. Cl. .................................... 303/15; 303/16
[58] Field of Search ............... 303/3, 15, 7, 20, 36, 303/37, 38, 16, 17, 18

[56] References Cited
U.S. PATENT DOCUMENTS

| | | | |
|---|---|---|---|
| 3,583,771 | 6/1971 | Dressler, Jr. | 303/15 |
| 3,799,623 | 3/1974 | Wickwam et al. | 303/15 |
| 3,901,558 | 8/1975 | Burkett | 303/16 |
| 4,043,605 | 8/1977 | Hart | 303/37 |
| 4,125,294 | 11/1978 | Cannon | 303/37 |
| 4,226,482 | 10/1980 | Stable et al. | 303/37 |
| 4,536,040 | 8/1985 | Eder | 303/37 |
| 4,783,124 | 11/1988 | Gaughan et al. | 303/37 |
| 4,830,437 | 5/1989 | Rumsey | 303/15 |
| 4,904,027 | 2/1990 | Skantar et al. | 303/15 |
| 5,090,780 | 2/1992 | Powell | 303/15 |

*Primary Examiner*—Matthew C. Graham
*Attorney, Agent, or Firm*—J. B. Sotak

[57] ABSTRACT

A microprocessor based electro-pneumatic locomotive brake control system in which a brake application is obtained automatically on the locomotive consist and train only in response to a loss of power at the lead or controlling locomotive microprocessor, and not in response to a loss of power at a trail or non-controlling locomotive microprocessor. The brake control system provides for releasing such a fail-safe brake application at the locomotive independently of the train brakes.

15 Claims, 3 Drawing Sheets

ELECTRO-PNEUMATIC LOCOMOTIVE BRAKE CONTROL SYSTEM

BACKGROUND OF THE INVENTION

The present invention relates to micro-processor based electro-pneumatic type locomotive brake control systems and particularly to a pneumatic backup arrangement for such a locomotive brake control system.

Modern day locomotive controls, including the locomotive brake control system, incorporate computer technology to reduce hardware and to facilitate adaptation of the system to various customer requirements.

In one such brake control system, a handle operated, brake command controller outputs a desired brake command signal to a microprocessor unit, which interprets this brake command signal in terms of a feedback signal indicative of the pressure of air in an equalizing reservoir, and then effects operation of application and release electro-magnetic valves to adjust the equalizing reservoir pressure in accordance with the brake command signal.

A high capacity pneumatic relay valve device is employed to vary the trainline brake pipe pressure in accordance with variations of the equalizing reservoir pressure, in order to control the railway car brakes. This so-called brake pipe control circuit of the aforementioned brake control system is shown and described in the U.S. Pat. No. 4,904,027, which is incorporated herein by reference.

The brake control system further includes a locomotive automatic brake control circuit having electro-pneumatic application and release valves and additional electro-pneumatic application and release valves in an independent brake control circuit. The automatic brake control electro-pneumatic valves are operated by the microprocessor in response to changes in brake pipe pressure initiated by the brake pipe control circuit in accordance with movement of an automatic brake handle of the brake command controller. Another high capacity pneumatic relay valve device regulates the pressure in the locomotive brake cylinders according to the pressure output (brake pipe pressure) of the automatic brake control circuit application and release electro-pneumatic valves.

The independent brake application and release electro-pneumatic valves are also controlled via the microprocessor according to movement of an independent brake handle of the brake command controller in a manner similar to operation of the brake pipe control circuit.

A double check valve is provided to direct the higher pressure of the automatic and independent brake control circuits to a high capacity pneumatic relay valve device, which in turn establishes the locomotive brake cylinder pressure.

Such an arrangement makes it possible to not only obtain locomotive braking independently of the train brakes, but also allows the independent locomotive brake to be released without releasing the train brakes, following an automatic brake application.

This latter function, commonly referred to as "bail-off" or "quick release", is obtained by means of a push button operated quick release switch that is preferably located on the independent handle. The switch contact transmits an electrical quick release signal to a quick release electro-pneumatic valve that in turn operates a high capacity pneumatic relay valve that pressurizes the locomotive consist actuating pipe. Pressure switches on the controlling and non-controlling locomotives are operated by the actuating pipe pressure to transmit the quick release signal to the microprocessor unit on the respective controlling and non-controlling locomotives to affect a release of the locomotive consist brakes.

In this aforementioned brake control system, the microprocessor controlled electro-pneumatic valves in the brake pipe control circuit and locomotive automatic brake control circuit are arranged in a fail-safe configuration, the reason being to bring the train to a halt automatically in the event of a microprocessor malfunction. In such a fail-safe configuration, deenergization of the electro-pneumatic valves, due to inability of the microprocessor to produce power at its outputs, results in the locomotive brakes being applied. This holds true on both lead and trail locomotives.

While such a fail-safe brake application is desirable from the standpoint of bringing the train to a stop in the event a loss of power occurs at the microprocessor, it leaves the locomotive engineer vulnerable, in terms of being unaware of such a fail-safe brake application occurring on a trail unit of a locomotive consist. This can result in a dangerous operating condition including dragging brakes which can heat up and damage the locomotive wheels. It will be understood that the automatic brake valve or equivalent electronic brake control means on a trailing unit is cut out, so that no brake pipe pressure reduction and thus no brake application on the lead locomotive and cars of the train is effected as a result of the electro-pneumatic valves in the brake pipe control circuit on the trail unit assuming a fail-safe brake application state.

While the foregoing problem can be solved by simply reversing the configuration of the electro-pneumatic valves in the locomotive automatic brake control circuit, so as to assure a brake release state in the absence of power, this obviously compromises the desideratum of a fail-safe brake application on a lead or controlling locomotive.

SUMMARY OF THE INVENTION

An object of the present invention, therefore, is to incorporate a pneumatic back-up locomotive brake control valve in an electro-pneumatic brake control system in order to provide a means of obtaining a fail-safe locomotive brake in bypass of the electro-pneumatic valves in the locomotive automatic brake control circuit.

Another object of the invention is to provide a pneumatic back-up control valve having a simple means of releasing a pneumatic back-up brake application independently of the train brakes during such time as the microprocessor supplied power is lost, in order to permit removal of the locomotive from the train.

Briefly, these objectives are carried out by an electro-pneumatic brake control system for a railway train having a brake pipe normally charged to a certain chosen pressure, a brake controller having a first handle including means for generating an automatic brake command signal in accordance with a selected position of the first handle, a first brake control circuit having first electro-pneumatic valve means for controlling the brake pipe pressure, a second brake control circuit having second electro-pneumatic valve means for controlling the brake pressure of a locomotive of the railway train, microprocessor means for controlling the first electro-pneumatic valve means in accordance with the automatic brake command signal and for controlling the second electro-pneumatic valve means in accordance with a change in the brake pipe pressure, pneumatic back-up control valve means operative in response to a change in the brake pipe pressure for controlling the locomotive brake pressure in parallel with the second electro-pneumatic valve means, the first electro-pneumatic valve means being arranged to effect a reduction of the brake pipe pressure in a deenergized condition and the second electro-pneumatic valve means being arranged to effect a release of the locomotive brake pressure in a deenergized condition.

These and other objects and advantages of the invention will become apparent from the following more detailed explanation when taken in conjunction with the accompanying drawings in which.

DESCRIPTION OF THE INVENTION

Figure 1:
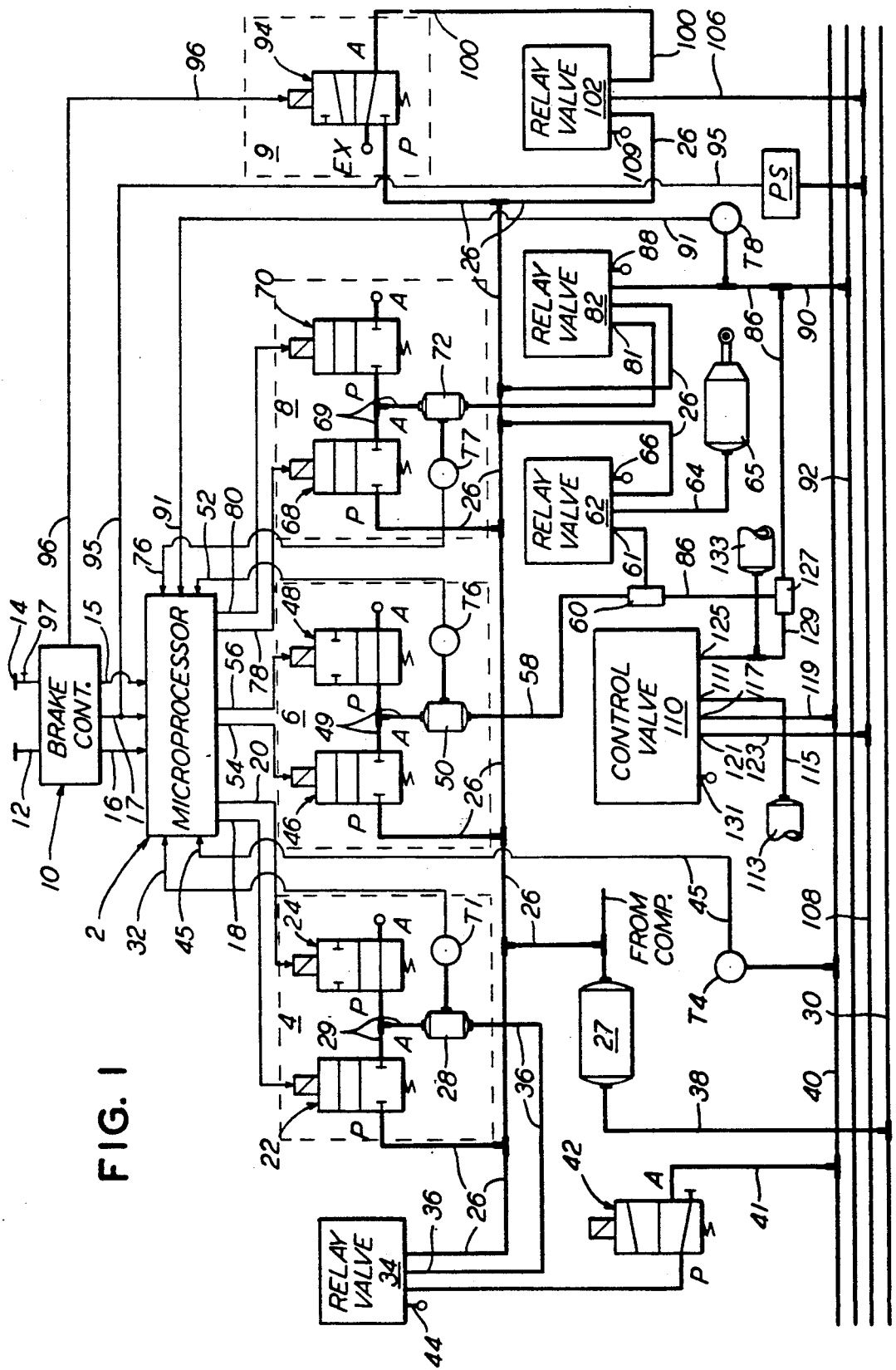
FIG. 1 is a block diagrammatic of an electro-pneumatic brake control system arranged in accordance with the present invention.

Referring to FIG. 1 of the drawings, there is shown a locomotive electro-pneumatic brake control system having a microprocessor 2 that controls a brake pipe pressure control circuit 4, a locomotive automatic brake control circuit 6, a locomotive independent brake control circuit 8, and a quick release circuit 9. Microprocessor 2 receives input signals from a brake command controller 10 having an automatic brake control handle 12 and an independent brake control handle 14.

Manual operation of automatic brake control handle 12 to one of a plurality of discrete selected positions between brake release and full service positions establishes a level of brake pipe pressure corresponding to brake release and a desired level of application. The incremental handle position selected is converted into a corresponding electrical brake command signal by a suitable encoder, or the like, which is fed to microprocessor 2 via line 16. Microprocessor 2 responds to this brake command signal and generates a regulated 24 volt output signal at wires 18, 20 via which the solenoid operators of two-way, spring returned application and release electro-magnetic valves 22, 24 are actuated. Application valve 22 is normally closed and release valve 24 is normally open, the inlet P of application valve 22 being connected by a pipe 26 to a main reservoir 27 to which air is supplied from a compressor (not shown), and the outlet A of release valve 24 being connected to atmosphere. Main reservoir 27 is connected by a pipe 38 to a main reservoir equalizing pipe 30 that is interconnected between the units of a locomotive consist. A control reservoir 28 is connected to a pipe 29 via which outlet A of application valve 22 is connected to inlet P of release valve 24. A pressure transducer T1 monitors the pressure in control reservoir 28 and transmits a corresponding feedback signal to microprocessor 2 via wire 32.

The control port of a high capacity pneumatic relay valve 34 is connected via pipe 36 to control reservoir 28. Relay valve 34 may be a conventional, well-known C-2 type relay valve typically employed in the 26 type locomotive brake valves and also in the 30-CW module manufactured by the Westinghouse Air Brake Company. Relay valve 34 further includes a supply port that is connected by pipe 26 to main reservoir 27, a delivery port that is connected by a pipe 41 to brake pipe 40, and an exhaust port 44 that is connected to atmosphere. An electro-pneumatic cut-out valve 42 is provided in pipe 41 having a normally closed position in which its inlet P is cut-off from outlet A, and an open position in which inlet A is communicated with outlet p Cut-out valve 42 is open on lead units to establish communication between brake pipe 40 and relay valve 34 and closed on trail units to interrupt such communication. Relay valve 34 operates to vary the pressure in train brake pipe 40 in accordance with the pressure in control reservoir 28, supplying air from main reservoir 27 to pipe 41 or releasing air from brake pipe 40 via pipe 41 and exhaust port 44. The train brake pipe 40 carries pressure to the cars in the train, the brakes of which are controlled in accordance with variation of brake pipe pressure in a well-known manner.

The locomotive automatic brake control circuit 6 is controlled in accordance with either the brake pipe pressure, as monitored by a transducer T4, which transmits a corresponding electrical feedback signal via wire 45 to microprocessor 2 and/or independent application and release pipe 92 pressure as monitored by a transducer T8, which also transmits a corresponding electrical feedback signal via wire 91 to microprocessor 2. This permits the microprocessor to establish the locomotive brake cylinder pressure.

Locomotive automatic brake control circuit 6 consists of a normally closed, two-way, spring returned, electro-pneumatic application valve 46, a normally open, two-way, spring returned, electro-pneumatic release valve 48, a control reservoir 50 and a pressure transducer T6. Inlet P of application valve 46 is connected via pipe 26 to main reservoir 27, while outlet A of release valve 48 is connected to atmosphere. Reservoir 50 is interconnected between outlet A of application valve 46 and inlet P of release valve 48 via a pipe 49 to which control reservoir 50 is connected. Transducer T6 instantaneously monitors the pressure in reservoir 50 and transmits a corresponding electrical feedback signal to microprocessor 2 via wire 52. The solenoid operators of the respective application and release valves 46, 48 are connected by wires 54, 56 to microprocessor 2, which is capable of supplying 24 volts to these control wires under normal operating conditions. The pressure in control reservoir 50 is regulated by these electro-pneumatic application and release valves in inverse relationship and at a predetermined ratio relative to brake pipe pressure changes. Reservoir 50 is connected by a pipe 58 to one inlet of a double check valve 60, the outlet of which is connected via pipe 61 to the control port of a high capacity pneumatic relay valve 62. This relay valve 62 may be a well-known, standard J-type relay valve device manufactured by the Westinghouse Air Brake Company, further having a supply port that is connected by pipe 26 to main reservoir 27, a delivery port that is connected by a pipe 64 to the locomotive brake cylinder device 65, and an exhaust port 66 that is connected to atmosphere. Relay valve 62 provides the required high capacity to supply compressed air from main reservoir pipe 26 to brake cylinder device 65, and to release brake cylinder pressure via exhaust port 66, in accordance with the pressure level established in reservoir 50.

The locomotive independent brake control circuit 8 also consists of a solenoid operated, spring returned, two-way, electro-pneumatic application valve 68 and release valve 70, a control reservoir 72 and a transducer T7. Inlet P of application valve 68 is connected by pipe 26 to main reservoir 27, while outlet A of release valve 70 is connected to atmosphere. Reservoir 72 is interconnected between outlet A of application valve 68 and inlet P of release valve 70 via a pipe 69 to which control reservoir 72 is connected. Transducer T7 instantaneously monitors the pressure in reservoir 72 and transmits a corresponding electrical feedback signal to microprocessor 2 via wire 76. Application and release valves 68 and 70 are normally closed, their respective 24 volt solenoid operators deenergized through microprocessor 2 connected wires 78, 80. Independent handle 14 of brake controller 10 generates an electrical brake command signal that is transmitted to microprocessor 2 via wire 15 according to the selected position of handle 14, in a manner similar to the manner in which the application and release valve solenoids in the brake pipe control circuit 4 are controlled. A pipe 81 is connected between reservoir 72 and the control port of a relay valve 82, such as the J-type relay valve device associated with the locomotive automatic brake control circuit 6. This relay valve 82 further includes a supply port that is connected by a pipe 26 to main reservoir 27, a delivery port that is connected by a pipe 86 to the control port of relay valve 62 via the other inlet of double check valve 60 and pipe 61, and an exhaust port 88 that is connected to atmosphere. A branch pipe 90 of pipe 86 is connected to an independent application and release pipe 92 that is interconnected between the respective units of a locomotive consist. Relay valve 82 provides the high capacity air requirement for pipe 92.

Quick release control circuit 9 includes a solenoid operated, spring returned, three way, electro-pneumatic quick release valve 94, the solenoid of which is connected by a wire 96 to brake controller 10 to provide a quick release signal when a manually operable, quick release switch 97 is actuated. Preferably, this quick release switch is incorporated in independent handle 14 in such a way as to permit the operator to actuate the quick release switch, while at the same time manipulating the handle for independent brake control.

Quick release valve 94 includes an inlet P that is connected by a pipe 26 to main reservoir 27, an outlet EX that is connected to atmosphere, and an outlet A that is connected by a pipe 100 to the control port of a high capacity pneumatic relay valve 102. This relay valve 102 further includes a supply port to which main reservoir 27 is connected by pipe 26, a delivery port connected by a pipe 106 to an actuating pipe 108, and an exhaust port 109 connected to atmosphere. Relay valve 102 may also be a well-known, J-type relay valve device, and is provided to handle the high capacity air requirement of actuating pipe 108, which runs through the locomotive consist.

Associated with quick release circuit 9 is a pressure switch PS that is connected to actuating pipe 108 in order to provide an electrical signal to microprocessor 2 via a wire 95 indicative of a quick release operation being initiated on a lead locomotive. This signal provides the means by which a trailing locomotive automatic brake application may be quick released in conjunction with release of the lead locomotive automatic brake application when the quick release switch 97 is actuated on the lead locomotive.

Figure 3:
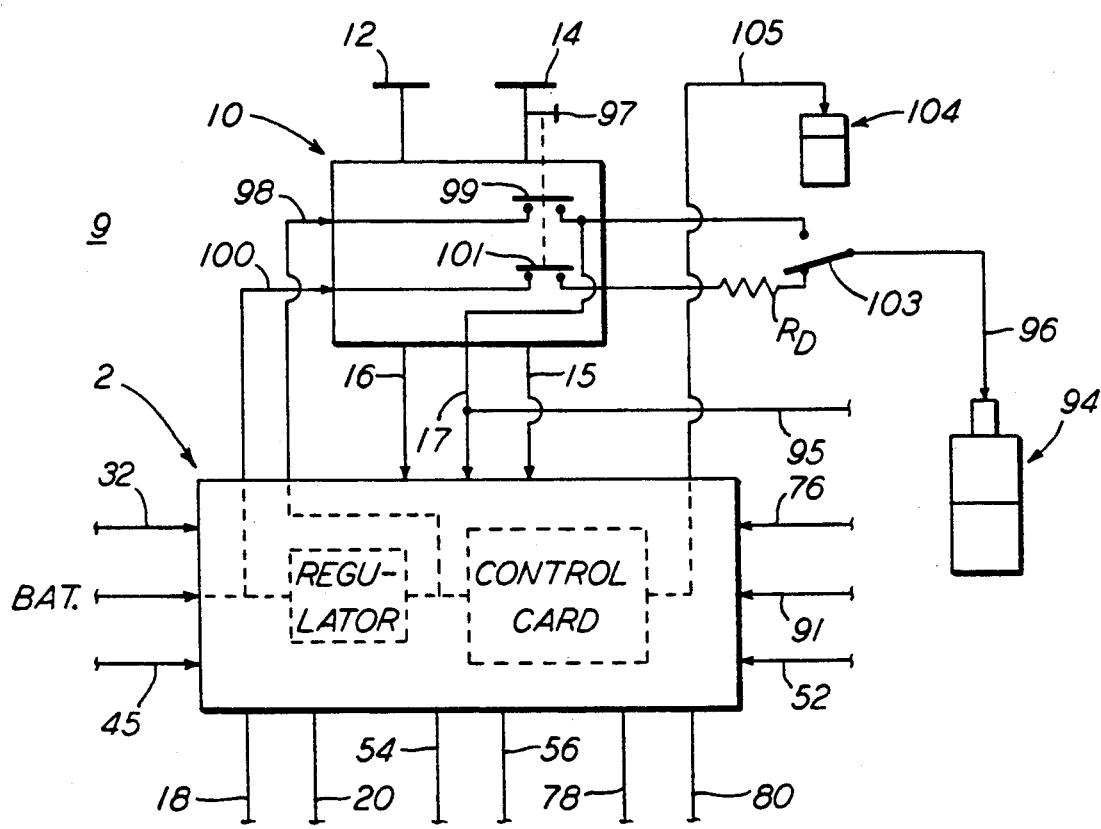
FIG. 3 is an electrical circuit via which a quick release valve of the control valve device of FIG. 2 may be operated to "bail-off" the locomotive brake independently of the train brakes.

In FIG. 3 is shown a circuit for connecting either a primary 24 volt source of power or an alternative power source such as the locomotive battery to the solenoid of quick release valve 94 when quick release switch 97 is actuated. Such a means of providing an alternative power source is necessary in order to maintain ability to quick release the locomotive automatic brake following a pneumatic back-up application in response to a power loss in or malfunction of microprocessor 2. Battery voltage of 72 volts is connected to microprocessor 2 via wire BAT, where it is converted by a voltage regulator device to 24 volts, in a well-known manner. This regulated 24 volt supply is connected via wire 98 to one pole of a normally open contact 99 of quick release switch 97, while a wire 100 connects the 72 volt battery supply to one pole of another normally open contact 101 of quick release switch 97. The other pole of contact 99 is connected to the normally open contact set 103 of loss or power electrical relay 104, while the other pole of contact 101 is connected to the normally closed contact set 103 of electrical relay 104 via a dropping resistor $R_D$. This contact set 103 is connected to wire 96 and is controlled by loss of power relay 104 that is normally connected by a wire 105 to microprocessor 2. Wire 105 is normally connected to the microprocessor control card, so as to carry 24 volts during normal operation of microprocessor 2, in effecting control of the system electro-pneumatic valves, and to transition contact set 103 to a condition opposite that shown while electrical relay 104 is energized.

In FIG. 1, the locomotive automatic brake control circuit 6 is further provided with a pneumatic back-up automatic brake control valve 110. This brake control valve 110 is a basic MC-30C type control valve device that is modified to replace the usual emergency valve feature thereof with a quick release valve 112, shown in FIG. 2, in accordance with the present invention, as hereinafter explained. The MC-30C control valve is well known in the railroad braking industry, being manufactured by the Westinghouse Air Brake Company, and shown and described in Operation and Maintenance brochure 4220-5, published by the Westinghouse Air Brake Company.

As shown in FIG. 1 of the drawings, brake control valve 110 includes a supply port 111 to which an auxiliary reservoir 113 is connected via a pipe 115, a control port 117 to which brake pipe 40 is connected via a pipe 119, a quick release port 121 to which actuating pipe 108 is connected via a pipe 123, a delivery port 125 to which pipe 86 is connected via a double check valve 127 and a pipe 129, and an exhaust port 131 that is connected to atmosphere. Connected to pipe 129 is a displacement reservoir 133 that simulates the brake cylinder displacement volume to assure operation of control valve 110 to obtain the proper brake cylinder pressure development.

Figure 2:
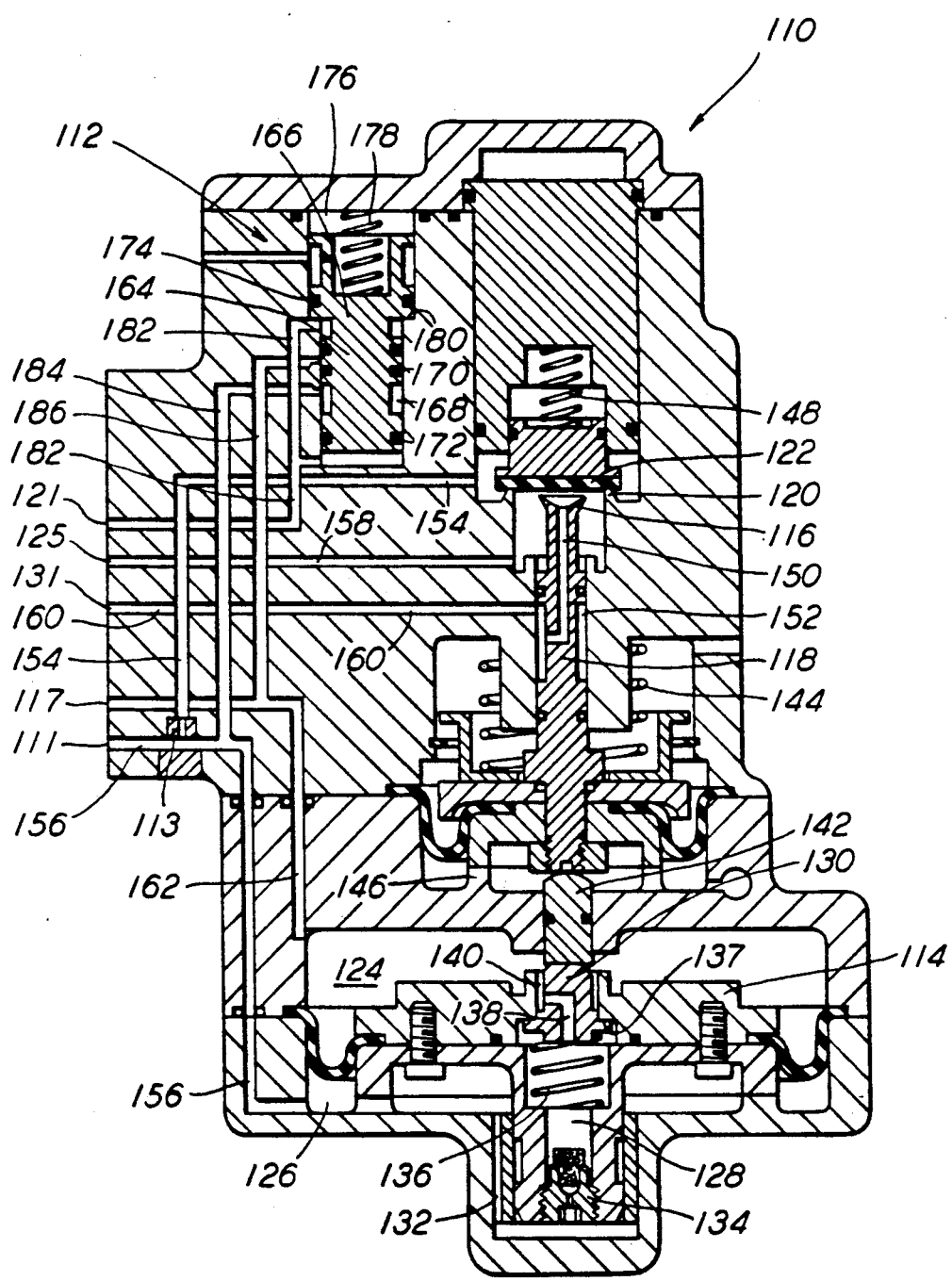
FIG. 2 is a diagrammatic sectional assembly view of a pneumatic back-up control valve device used in the arrangement of the present invention.

Referring to FIG. 2 of the drawings, the brake control valve 110 further includes, in addition to quick release valve 112, a piston valve assembly comprising a diaphragm type control piston 114, an exhaust valve seat 116 at one end of a piston stem 118, a supply valve seat 120 formed on the valve body in surrounding relationship with exhaust valve seat 116, and a valve element 122 with which the supply valve and exhaust valve seats are engageable.

Control piston 114 cooperates with the valve body to form a control chamber 124 on one side and a reference chamber 126 on the opposite side. Carried in a central cavity 128 of piston 114, so as to have limited axial movement relative thereto, is a charging and dissipation valve 130. A passage 132 between chamber 126 and cavity 128 is provided with a charging and dissipation choke 134. A relatively light spring 136 biases charging and dissipation valve 130 to its upper-most position against a stop shoulder 137 as viewed in the drawing, while another passage 138 in charging and dissipation valve 130 establishes communication between cavity 128 and control chamber 124 via an annular groove 140.

A pusher pin 142 is carried in the valve body, one end being engageable with charging and dissipation valve 130 and the other end with the end of piston stem 118 opposite exhaust valve seat 116. Another spring 144 that is stronger than spring 136 biases stem 118 in a downward direction toward engagement with a stop 146. In this release and charging position, as shown in the drawing, exhaust valve seat 116 is displaced from valve element 122, which is forced by a light spring 148 into engagement with supply valve seat 120. A central passage 150 in stem 118 is connected between an annular groove 152 in stem 118 and the end of stem 118 having exhaust valve seat 116. A passage 154 connects the area surrounding supply valve seat 120 with supply port 111 via a control choke 113, and a branch 156 of passage 154 is connected to reference chamber 126. Another passage 158 connects the area within the bounds of supply valve seat 120 with delivery port 125; a passage 160 connects the annular groove 152 to exhaust port 131; and a passage 162 connects chamber 124 to control port 117.

Quick release valve 112 is comprised of a piston spool valve member 164 having a head portion 166 forming a piston and an annular groove 168 on the opposite sides of which are disposed O-ring seals 170, 172. Another O-ring seal 174 separates the underside of head portion 166 from a vented chamber 176 on the opposite side in which a bias spring 178 is disposed to urge the piston and spool member toward engagement with a stop shoulder 180 formed on the control valve body, in a deactuated position of the quick release valve.

A passage 182 is connected between quick release control port 121 and the underside of spool member 164 and head portion 166, a branch passage 184 is connected between passage 156 and spool member 164, such as to remain in communication with spool groove 168 in both the actuated and deactuated positions of quick release valve 112, and a branch passage 186 is connected between passage 162 and spool member 164 at a location axially spaced from spool groove 168 such a distance as to be uncovered by the spool groove in the deactuated position of the quick release valve.

Initial Charging

Prior to initial charging, i.e., prior to power being supplied from brake controller 10 to wire 17 leading to microprocessor 2, the electro-magnetic valves in the respective brake control circuits 4, 6, 8 and 9 are deenergized, and accordingly assume a normal position, as shown, under the influence of their return springs. Consequently, control reservoir 28 is vented to atmosphere via outlet A of release valve 24.

When power is subsequently turned on and handle 12 is moved to release position to initiate charging, a difference exists between the brake command signal transmitted to microprocessor 2 via wire 16, in accordance with handle 12 of brake controller 10 being in release position, and the feedback signal transmitted from transducer T1 to microprocessor 2 via wire 32, indicative of the pressure level of control reservoir 28. The polarity of this signal difference causes microprocessor 2 to energize electro-magnetic application and release valves 22, 24, of the brake pipe control circuit 4, thereby causing these valves to be shifted from their normal deenergized positions represented by the connections shown in lower valve envelope to the position represented in the upper valve envelope. Consequently, compressed air is connected from main reservoir 27 to control volume 28 via pipe 26, ports P and A of application valve 22 and pipe 29, this pressure in pipe 29 being cut off from atmosphere at port P of release valve 24.

When the pressure in control reservoir 28 corresponds substantially to the brake command signal at wire 16, microprocessor 2 deenergizes application valve 22, while maintaining release valve 24 energized. This establishes a lap condition in which further supply and release of control reservoir 28 pressure is terminated, it being understood that as the control reservoir pressure approaches the command pressure, application valve 22 is controlled in accordance with the referencing Patent in order to prevent overshoot and consequent valve cycling.

This control reservoir pressure is in turn connected via pipe 36 to relay valve 34, which in turn supplies air from main reservoir 27 to brake pipe 40 via pipes 26 and 41. In this manner the train brake pipe pressure is charged to a predetermined running pressure, which can be adjusted at microprocessor 2, as desired.

Brake pipe pressure is concurrently supplied via pipe 119 and supply port 117 of control valve 110 to control chamber 124 thereof, as shown in FIG. 2. As the brake pipe pressure increases, piston 114 is forced to its downward-most position, as shown, in which spring 136 is effective to force charging and dissipation valve 130 into engagement with stop shoulder 137. In this position, charging and dissipation valve 130 opens a charging port via annular groove 140 and central passage 128 through which reference chamber 126 and reservoir 113 are charged to the pressure in brake pipe 40 and control chamber 124. In this downward-most position of piston 114, spring 144 is effective to force stem 118 into engagement with its stop 146, thereby causing exhaust valve seat 116 to pull away from valve element 122, which is in turn forced by its spring 148 to engage the supply valve seat 120. Brake cylinder control pressure in pipe 129 and displacement reservoir 133 is thus vented via delivery port 125, passage 158, the open exhaust valve, central passage 150, annular groove 152 in stem 118, passage 160 and exhaust port 131.

Further, during charging of brake pipe 40, transducer T4 transmits a feedback signal to microprocessor 2 via wire 45. Until the charging brake pipe pressure builds up to a value corresponding to the brake command signal transmitted to microprocessor 2 via wire 16 in full release position of handle 12, i.e., the desired running or charge pressure of the train, application and release valves 46, 48 of locomotive automatic brake control circuit 6 remain deenergized, as shown. In this deenergized condition, application valve 46 interrupts the supply of main reservoir air to control reservoir 50 by disconnecting its inlet and outlet ports P, A, and release valve 48 connects control reservoir 50 to atmosphere via pipe 47 and its connected inlet and outlet ports P, A.

With independent handle 14 of brake controller 10 also being set in release position during this initial charging, the application and release valves of independent brake control circuit 8 are deenergized, as shown. The application and release valve are both closed in the deenergized state, as shown, whereby control reservoir 72 is cut off from main reservoir supply at the application valve and from atmosphere at the release valve.

It will be appreciated from the foregoing that control pipe 61 of relay valve 62 is vented via double check valve 60 and either pipe 58 leading to the vented control reservoir 50 or pipe 129 leading to control valve 110 via pipe 86 and double check valve 127. Brake cylinder 65 is accordingly vented via exhaust port 66 to maintain the locomotive brakes released during this charging of the brake pipe.

Application of Automatic Train Brakes

Following charging of brake pipe 40, a brake application may be initiated on the locomotive consist and the cars of the train by movement of automatic handle 12 out of release position into the service application zone on the lead or controlling locomotive. The handle position is encoded and fed to microprocessor 2 via wire 16. The polarity of the difference between the electrical brake command signal at wire 16 and the electrical feedback signal at wire 32 causes microprocessor 2 to de-energize wire 20 while also maintaining wire 18 de-energized. Application valve 22 thus continues to interrupt the supply of main reservoir pressure at inlet P thereof, while release valve 24 transitions to the position shown, in which its inlet P is connected to outlet A. The pressure in control reservoir 28 is thus released to atmosphere via pipe 29 and release valve 24 until the signals at wires 16 and 32 substantially correspond. When this occurs, microprocessor 2 causes wire 18 to remain de-energized, while energizing wire 20. Consequently both the application valve 22 and the release valve 24 assume a closed state in which no further change in control reservoir pressure occurs.

The resultant reduction of control reservoir pressure is reflected at the control port of relay valve 34, which, in turn, operates to vent brake pipe 40 via branch pipe 41 at the lead or controlling locomotive unit and the exhaust port 44 of relay valve 34. Pressure in the trainline brake pipe 40 is thus reduced in accordance with the pressure reduction of control reservoir 28 to cause a brake application on the cars of the train in accordance with the selected position of brake controller automatic handle 12 in the service brake zone.

Application of Locomotive Automatic Brake

Concurrently, an electrical feedback signal is transmitted to microprocessor 2 at both the lead and trail locomotive via transducer T4 and wire 45 corresponding to the instantaneous pressure in brake pipe 40. Since this brake pipe feedback signal at wire 45 is less than the encoded brake command signal at wire 16 following initial charging, microprocessor 2 activates the locomotive automatic brake control circuit 6, by energizing application valve 46 and release valve 48 via wires 54 and 56. Application valve 46 is shifted to its open position, in which inlet P is connected to outlet A, while release valve 48 is shifted to its closed position, in which outlet A is cut off from inlet P. Main reservoir pressure is thus supplied to control reservoir 50 via pipe 26, application valve 46, and pipe 49, until such time as the electrical feedback signal from transducer T6 to microprocessor 2 via wire 52 increases in proportion to the brake pipe pressure reduction in effect. It will be appreciated that microprocessor 2 establishes this control of the application and release valves 46, 48 of locomotive automatic brake control circuit 6, such that the pressure of control reservoir 50 varies inversely with the brake pipe pressure reduction in a ratio of approximately 2.5:1.

The resultant pressure developed in control reservoir is connected to the control port of relay valve 62 via pipe 58, double check valve 60 and pipe 61. Relay valve 62 in turn operates to supply air from main reservoir 27 to brake cylinder 65 via pipe 26 and delivery pipe 64. In this manner, the lead and trail locomotive brake pressure that is controlled by the respective brake control circuit 6 is consistent with the train brakes under control of the lead locomotive brake pipe control circuit 4.

Application of Locomotive Pneumatic Back-up Brake

Pneumatic control valve device 110 provides a back-up pneumatic automatic locomotive brake, operating in parallel with automatic brake control circuit 6, in response to variations in brake pipe pressure. Referring to FIG. 2, a reduction of brake pipe pressure as explained relative to applying the car brakes throughout the train, is reflected at control chamber 124 of control valve 110. Due to charging choke 134, the pressure in reference chamber 126 is prevented from following the pressure drop in chamber 124, so that a pressure differential is established there between. The resultant initial upward movement of piston 14 causes charging and dissipation valve 130 to interrupt the pressure communication between chambers 124 and 126, thereby encouraging positive upward movement of piston 114 to application position. Exhaust valve seat 116 engages valve element 122 and displaces the valve element from supply valve seat 120 in response to movement of piston 114 and thus stem 118 to application position. Auxiliary reservoir 113 pressure is thus connected to displacement reservoir 133 and double check valve 60 via pipe 115, supply port 111, control valve passage 156, application choke 113, passage 154, the open supply valve, passage 158, delivery port 125, and pipe 129, double check valve 127, and pipe 86. Due to the delay imposed by choke 113, the pressure in pipe 86 under control of automatic brake control circuit 6 reaches double check valve 60 before the pressure in pipe 86, thus holding the pneumatic back-up control valve pressure in abeyance pending failure of the automatic brake control circuit, due to a microprocessor malfunction, for example, as will be hereinafter explained.

When the auxiliary reservoir pressure effective in reference chamber 126 is reduced substantially to the pressure in control chamber 124, by volumetric equalization with displacement reservoir 133, spring 144 forces stem 118 and piston 114 in a downward direction until valve element 122 engages supply valve seat 120 to terminate further charging of displacement volume 133 and the piston valve assembly is stabilized in this lap position.

Further, the lead and trail locomotive brakes may be controlled independently of automatic brake control circuit 6 or control valve device 110 by means of independent control circuit 8 and/or quick release circuit 9.

Application of Independent Locomotive Brake

Independent brake control circuit 8 is operated by movement of independent handle 14 of brake controller 10 at the lead or controlling locomotive from a release position to an application position, the degree of application corresponding to the position of handle 14 in a brake application zone between release and full application positions. Movement of handle 14 to an application position, either from release position or from a lower application position within the application zone, is encoded to provide a brake command signal at wire 15, this signal being greater than the signal prior to such movement of independent handle 14, as reflected by the feedback signal from transducer T7 effective at wire 76. The polarity of the difference between these signals prompts microprocessor 2 to energize wire 78 and deenergize wire 80. Application valve 68 of independent brake control circuit 8 is thus operated to its open position in which inlet P is connected to outlet A, and release valve 70 is operated to its closed position in which inlet P is cut off from outlet A. Pressure in main reservoir 27 is thus supplied to control reservoir 70 via pipe 26, the open application valve 68 and pipe 69 until such time as the control reservoir pressure, as monitored by transducer T7 builds up to a value corresponding to the selected position of independent handle 14. When this occurs, the electrical signals at wire 15 and feedback wire 76 will be substantially the same to cause microprocessor 2 to deenergize wires 78 and 80. This, in turn, causes application and release valves 68, 70 to assume a closed position, as shown, in which further supply and release of pressure in control reservoir 72 is withheld until such time as a further difference signal develops between brake command wire 15 and feedback wire 76. The polarity of such a difference signal determines whether the control reservoir 72 pressure increases further or decreases.

Pressure in control reservoir 72 is effective at the control port of relay valve 82, which in turn supplies air from main reservoir 27 to double check valve 127 via pipes 26 and 86. In the absence of a brake application via either the automatic locomotive brake control circuit 6 or back-up control valve device 112, the independent brake control pressure in pipe 86 will pass through double check valve 127 and double check valve 60 to operate relay valve 62 and accordingly control the pressure delivered to the locomotive brake cylinder 65. Even if the locomotive brake cylinder pressure is applied through the automatic brake control circuit at some value less than full service, the independent brake control circuit can provide higher brake cylinder pressure at the locomotive independently of the car brakes throughout the train.

This independently controlled locomotive brake pressure is also connected from pipe 86 of relay valve 82 to pipe 90 leading to independent application and release trainline pipe 92 to transmit the independent brake control pressure to a trailing one or more locomotives.

This independent brake control pressure is limited to a maximum value that is compatible with locomotive brake equipments that employ multiplying relay valves, such as the standard 26-L type. Transducer T8 converts the independent brake control pressure to a corresponding electrical feedback signal that is connected via wire 91 to microprocessor 2. The microprocessor is programmed to multiply this feedback signal of the independent brake control pressure and to control the locomotive brake pressure through electro-pneumatic valves 46, 48 of the locomotive automatic brake control circuit 6 to obtain the desired independent brake control pressure, whether the locomotive unit is conditioned for lead or trail operating status. Electro-pneumatic valves 46, 48 are energized until the feedback signal from transducer T6 to microprocessor 2 via wire 52 corresponds to the feedback control signal via wire 91, at which point the electro-pneumatic valves 46, 48 will assume a lap condition.

In the event locomotive brake cylinder pressure is already present at the time the independent brake is applied, the microprocessor will only be effective to increase the locomotive brake cylinder pressure to the extent of the independent brake control signal and the above-mentioned multiplication factor for which the microprocessor is programmed.

Microprocessor Malfunction on Lead Locomotive

In the event of a malfunction that would render the lead locomotive microprocessor 2 incapable of providing power to operate the respective electro-pneumatic valves heretofore discussed, the lead locomotive and train brakes will be applied automatically in response to the electro-pneumatic valves 22, 24 in brake pipe control circuit 4 assuming a de-energized condition, as shown in FIG. 1. Therefore, irrespective of the position of brake controller handles 12, 14, such loss of power causes control reservoir 28 to be exhausted via release valve 24. Relay valve 34, in turn, is operated to exhaust brake pipe pressure past open cut out valve 42 to accordingly initiate a brake application on the cars of the train in the usual, well-known manner.

This reduction of brake pipe pressure at the lead locomotive concurrently effects operation of pneumatic back-up control valve 110, as previously explained, at the lead and trail locomotives to effect a brake application via relay valve 62. Whereas this back-up pneumatic brake control is withheld under normal power conditions, by reason of the locomotive automatic brake control circuit 6 having precedence, as explained, de-energization of electro-pneumatic valves 46, 48, due to the power loss at microprocessor 2, causes control reservoir 50 to be vented so that no pressure is supplied to double check valve 60 via pipe 58. Consequently, control of the locomotive automatic brake is established via pipe 86 leading to the other side of double check valve 60 at the lead and trailing locomotives to apply the brakes on the lead and trail locomotives.

At the same time, the effective reduction of brake pipe pressure causes the train brakes to apply at each car and/or locomotive not so electronically equipped in the usual, well-known manner to bring the train to a safe halt.

Microprocessor Malfunction on Trail Locomotive

In accordance with the present invention, no brake application will occur in the event a trailing locomotive microprocessor should experience a malfunction, due to which the respective electro-pneumatic valves 22, 24 in brake pipe control circuit 4 are without power. Since cut out valve 42 is closed on the trail locomotive, any pressure reduction provided by relay valve 34 is isolated from brake pipe 40, thereby rendering the trail unit pneumatic back-up control valve 110 unresponsive to fail-safe operation of electro-pneumatic valves 22, 24 in brake pipe control circuit 4. Also, since electro-pneumatic valves 46, 48 are not arranged in a fail-safe brake configuration, i.e., valve 48 venting reservoir 50, it will be appreciated that no brake will be obtained through the locomotive automatic brake control circuit 6, due to this trail locomotive microprocessor power failure. Since the trail locomotive is not in a controlling mode, this loss of microprocessor power is of no consequence with respect to initiating a brake application and the danger of an unrecognized brake application existing on a trailing locomotive is eliminated. Moreover, the capability of a lead or controlling locomotive to initiate a brake application on a trailing locomotive that experiences a microprocessor power outage is retained through lead unit automatic brake control circuit 4 and relay valve 34. However, back-up control valve 110 remains available to furnish an automatic brake application, if so desired, on the trail unit when so commanded by brake pipe reduction initiated from the lead or controlling locomotive in the consist.

Quick Release of Locomotive Automatic Brake

The locomotive automatic brake may be released independently of the train brakes from the lead or controlling locomotive by actuating quick release switch 97 on independent handle 14 of brake controller 10, regardless of whether the brake application has occurred in the course of normal operation or by fail-safe operation due to a loss of power at microprocessor 2.

In the case where a brake application is in effect under normal microprocessor operating conditions, automatic brake control circuit 6 takes precedence over back-up pneumatic control valve 110 in establishing the locomotive brake pressure, as previously explained. In order to release the locomotive consist brakes without also releasing the train brakes, quick release switch 97 on the lead or controlling locomotive is actuated to effect closure of quick release switch contacts 99 and 101, as shown in FIG. 3. This connects 24 volts from the primary source of power at wire 98 to the front or normally open contact of loss of power relay 104 and concurrently connects the 72 volt battery supply from wire 100 to the back or normally closed contact of loss of power relay 104. Since loss of power relay 104 is energized via wire 105, due to the microprocessor operating normally, relay contact 103 of the loss of power relay 104 is energized, thereby connecting 24 volts from the front contact to the solenoid of quick release solenoid valve relay 94 whenever switch contact 99 is closed.

Concurrently, voltage is supplied from the 24 volt primary source to microprocessor 2 via wire 98, closed quick release contacts 99 and wire 17 to cause microprocessor 2 to de-energize electro-pneumatic valves 46, 48. In this de-energized condition, as shown, electro-pneumatic release valve 48 exhausts the brake control pressure in pipe 58 at the lead or controlling locomotive, as well as on any similarly equipped locomotive.

Quick release valve 94, FIG. 1, when energized is shifted from the position shown to the position represented in the upper valve envelope, in which position, port A is disconnected from atmosphere at port EX and is, in turn, connected to port P. Consequently, air is connected from main reservoir 27 to the control port of relay valve 102 via pipe 26, quick release valve 94, and pipe 100. Relay valve 102 is thence operated to connect main reservoir air from pipe 26 to quick release port 121 of back-up control valve 110 via pipe 106 and actuating pipe 108.

As can be seen in FIG. 2 and FIG. 3, the pressure at quick release port 121 is connected by passage 182 to the underside of quick release valve spool member 164 and piston head 166, thereby actuating quick release valve 112 to its release position in opposition to spring 178. In this release position, O-ring 170 is shifted to the side of passage 186 opposite the side shown, so that passages 184 and 186 are interconnected via spool groove 168. Consequently, reference chamber 126 is placed in communication with control chamber 124 via interconnected passages 184 and 186 to allow the slightly higher pressure in control chamber 124 to equalize with the lower pressure in chamber 126. This upsets the force balance on piston 114, whereby spring 144 is effective to force stem 118 further downward from a lap position, in which the piston valve assembly is assumed to be, to a release position in which the lower end of stem 118 is engaged with stop 146. In this release position, the upper end of stem 118 having exhaust valve seat 116 is pulled away from valve element 122, which remains engaged with supply valve seat 120. Accordingly, the air in pipe 129 and displacement reservoir 133 is vented to atmosphere via delivery port 125 of control valve 110, passage 158, the unseated exhaust valve, central passage 150 in stem 118, passage 160 and exhaust port 131.

With the release of air from Control reservoir 50 and displacement reservoir 133, the control pressure at the control port of relay valve 62 is also released via pipe 61, double check valve 60 and either pipe 58 or 86, depending upon whether the vented pressure at control reservoir 50 or displacement reservoir 133 is lower. Relay valve 62, therefore, is effective to release air from brake cylinder 65 via pipe 64 and the relay valve exhaust port 66, thus effecting a quick release of the lead locomotive brakes.

At the trailing locomotive, pressurization of actuating pipe 108 operates the quick release valve 112 of control valve 11? to exhaust pipe 129 and displacement reservoir 133, as explained relative to the lead locomotive. Concurrently, pressurization of actuating pipe 108 actuates pressure switch PS, which transmits the quick release signal to microprocessor 2 via wire 95, this quick release signal at wire 95 of the trail locomotive corresponding to the quick release signal initiated when quick release switch 97 and subsequently pressure switch PS is actuated on the lead locomotive, to eventually deenergize electro-pneumatic valves 46, 48 and thereby exhaust pressure from pipe 58. In consequence of this exhaust of pressure in pipes 58 and 129 at the trailing locomotive, the trailing locomotive brake cylinder 65 is exhausted, as explained relative to the lead or controlling locomotive.

Because of the interconnection of the independent and back-up brake control systems via double check valve 127, this exhaust of the lead and trail locomotive brake cylinder pressure is limited only to the extent the independent brake control circuit 8 may be calling for brake pressure.

In accordance with the foregoing, it will be appreciated that this invention provides for desired initiation of and subsequent resultant automatic brake application on locomotives and cars of a train in response to a loss of power at the microprocessor of only a lead or controlling locomotive, while prohibiting a loss of microprocessor power on a trail or non-controlling locomotive, from initiating a brake application. The invention further provides for "bail-off" of an automatic brake application on a trail locomotive that experiences a loss of power, as well as a lead locomotive.

We claim:

1. An electro-pneumatic brake control system for a railway train having a brake pipe normally charged to a certain chosen pressure comprising:
   (a) a brake controller having a first handle including means for generating an automatic brake command signal in accordance with a selected position of said first handle;
   (b) a first brake control circuit having first electro-pneumatic valve means for controlling the pressure of said brake pipe;
   (c) a second brake control circuit having second electro-pneumatic valve means for controlling the brake pressure of a locomotive of said railway train;
   (d) microprocessor means for controlling said first electro-pneumatic valve means in accordance with said automatic brake command signal, and for controlling said second electro-pneumatic valve means in accordance with a change of said brake pipe pressure;
   (e) pneumatic back-up control means operative in response to variation of said brake pipe pressure for controlling the brake pressure of said locomotive in parallel with said second electro-pneumatic valve means, said variation of said brake pipe pressure in a negative sense effecting application of the locomotive brakes; and
   (f) said first electro-pneumatic valve means being arranged to effect said variation of said brake pipe pressure in said negative sense in a deenergized condition thereof, and said second electro-pneumatic valve means being arranged to effect a release of said locomotive brake pressure in a de-energized condition thereof.

2. An electro-pneumatic brake control system, as recited in claim 1, further comprising cut-out valve means for selectively controlling fluid pressure communication between said first electro-pneumatic valve means and said brake pipe.

3. An electro-pneumatic brake control system, as recited in claim 1, further comprising quick release valve means for effecting release of said locomotive brake pressure by said pneumatic back-up control means independently of said brake pipe pressure variation.

4. An electro-pneumatic brake control system, as recited in claim 1, wherein said pneumatic back-up control means comprises:
   (a) a source of fluid under pressure;
   (b) brake means;
   (c) a control piston having a control chamber and a reference chamber formed on opposite sides thereof, each said chamber being charged to the pressure carried in said brake pipe;
   (d) valve means operable in response to movement of said control piston between a release and an application position;
   (e) said control piston being operable to said application position in response to a reduction of said control chamber pressure relative to said reference chamber pressure, said valve means in said application position of said control piston connecting said source of fluid pressure to said brake means.

5. An electro-pneumatic brake control system, as recited in claim 4, wherein said pneumatic back-up control means further comprises an auxiliary reservoir to which said reference chamber is connected, said auxiliary reservoir providing said source of fluid under pressure.

6. An electro-pneumatic brake control system, as recited in claim 5, further comprising quick release means for effecting pressure equalization between said control chamber and said reference chamber.

7. An electro-pneumatic brake control system, as recited in claim 6, wherein said quick release means comprises:
   (a) an actuating pipe on the locomotive of said train;
   (b) third electro-pneumatic valve means for controlling pressurization of said actuating pipe;
   (c) manually operable switch means for controlling energization of said third electro-pneumatic valve means; and
   (d) a piston valve having a release position in which fluid pressure communication is interrupted between said control chamber and said reference chamber and an application position in which said fluid pressure communication is established between said control chamber and said reference chamber to provide said pressure equalization therebetween, said piston valve being movable to said application position in response to pressurization of said actuating pipe.

8. An electro-pneumatic brake control system, as recited in claim 7, wherein said manually operable switch means further provides a quick release signal to said microprocessor to effect said de-energized condition of said second electro-pneumatic valve means.

9. An electro-pneumatic brake control system, as recited in claim 8, further comprising pressure switch means connected to said actuating pipe for providing said quick release signal to said microprocessor in parallel with said manually operable switch means.

10. An electro-pneumatic brake control system, as recited in claim 8, further comprising:
    (a) a primary source of electrical power;
    (b) an alternate source of electrical power;
    (c) power selector means for connecting one of said primary and said alternate sources of electrical power to said third electro-pneumatic valve means comprising:
        (i) an electrical relay connected to a power output of said microprocessor;
        (ii) a front contact of said electrical relay connected to said primary source of power;
        (iii) a back contact of said electrical relay connected to said alternate source of power; and
        (iv) a switch of said relay connected said third electro-pneumatic valve means, said switch being engageable with said front contact when said electrical relay is energized and engageable with said back contact when said electrical relay is de-energized; and
    (d) said manually operable switch means comprising:
        (i) a normally open first contact between said primary source of power and said front contact; and
        (ii) a normally open second contact between said alternate source of power and said back contact.

11. An electro-pneumatic brake control system, as recited in claim 10, further comprising:
    (a) a second handle of said brake controller including means for generating an independent brake command signal in accordance with a selected position of said second handle;

(b) a third brake control circuit having fourth electro-pneumatic valve means for controlling the brake pressure of the locomotive of said train in parallel with said second electro-pneumatic valve means and said pneumatic back-up control means; and (c) said microprocessor means further controlling said fourth electro-pneumatic valve means in accordance with said independent brake command signal.

12. An electro-pneumatic brake control system, as recited in claim 11, wherein said fourth electro-pneumatic valve means is operative in response to de-energization thereof to effect a release of the locomotive brake pressure.

13. An electro-pneumatic brake control system, as recited in claim 11, further characterized in that the predominant one between said second electro-pneumatic valve means and one of said fourth electro-pneumatic valve means and said pneumatic back-up control valve means provides the locomotive brake pressure.

14. An electro-pneumatic brake control system, as recited in claim 1, further comprising means interposed between said second brake control circuit and said pneumatic back-up control means for establishing one or the other thereof to provide said locomotive brake control.

15. An electro-pneumatic brake control system, as recited in claim 14, wherein said means interposed between said second brake control circuit and said pneumatic backup control means is a double check valve.

* * * * *